US012792117B2

(12) United States Patent

Davidov et al.

(10) Patent No.: US 12,792,117 B2

(45) Date of Patent: Nov. 10, 2026

(54) BOND-TO-BOND DIE INTERFACE

(71) Applicant: Apple Inc., Cupertino, CA (US)

(72) Inventors: Dany Davidov, Tirat Carmel (IL); Lior Zimet, Kerem Maharal (IL); Sergio Kolor, Haifa (IL); Hana Abo Hana, Mi'ilya (IL)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 18/887,819

(22) Filed: Sep. 17, 2024

(65) Prior Publication Data

US 2026/0079553 A1 Mar. 19, 2026

(51) Int. Cl.

*G06F 1/26* (2006.01)

*G06F 13/40* (2006.01)

(52) U.S. Cl.

CPC .......... *G06F 1/266* (2013.01); *G06F 13/4027* (2013.01)

(58) Field of Classification Search

CPC ............................. G06F 1/266; G06F 13/4027

See application file for complete search history.

(56) References Cited

U.S. PATENT DOCUMENTS 7,028,115 B1 4/2006 Rowlands et al.
7,953,992 B2 * 5/2011 Lee ........................... G06F 1/32 713/323
7,992,020 B1 * 8/2011 Tuan ..................... G06F 1/3296 713/323
8,812,878 B2 8/2014 Tan et al.
10,416,750 B2 * 9/2019 Black .................... G06F 1/3293
11,281,280 B2 3/2022 Tsien et al.
11,467,655 B1 * 10/2022 Sodhi .................... G06F 1/3296
11,733,767 B2 8/2023 Kakkireni et al.
12,007,823 B2 6/2024 Rajagopal et al.
12,019,494 B2 6/2024 Boecker et al.
12,621,590 B1 * 5/2026 Zahir ....................... H04Q 9/02

(Continued)

FOREIGN PATENT DOCUMENTS

CN 101989202 A 3/2011
CN 114489823 A 5/2022

(Continued)

OTHER PUBLICATIONS

International Search Report and Written Opinion in PCT Appl. No. PCT/US2025/046326 mailed Jan. 15, 2026, 9 pages.

*Primary Examiner* — Faisal M Zaman

(74) *Attorney, Agent, or Firm* — Kowert, Hood, Munyon, Rankin & Goetzel, P.C.; Scott W. Pape; Dean M. Munyon

(57) ABSTRACT

An apparatus may include a system including a plurality of integrated circuits (ICs), including a first IC having a first set of agent circuits and a second IC having a second set of agent circuits. The first IC may include a first interface with a first always-on portion and a first power-managed portion. The second IC may include a second interface coupled to the first interface, and having a second always-on portion and a second power-managed portion. A first agent circuit of the first set of agent circuits in the first IC may be configured to send, while the second IC is in a reduced power state, a transaction to a second agent circuit. The first interface may be configured to communicate, via the always-on portions of the first and second interfaces, with the second IC to cause the second IC to wake up the second agent circuit.

20 Claims, 9 Drawing Sheets

(56) References Cited

U.S. PATENT DOCUMENTS

| | | | | |
|---|---|---|---|---|
| 2009/0204834 | A1* | 8/2009 | Hendin | G06F 1/3287 713/323 |
| 2009/0292934 | A1* | 11/2009 | Esliger | G06F 1/3203 713/323 |
| 2010/0064160 | A1 | 3/2010 | Wilson et al. | |
| 2014/0281626 | A1* | 9/2014 | Younger | G06F 1/3287 713/323 |
| 2015/0362980 | A1* | 12/2015 | Tripathi | G06F 1/3287 713/324 |
| 2016/0077905 | A1* | 3/2016 | Menon | G06F 11/3648 714/37 |
| 2017/0177065 | A1* | 6/2017 | Rajwan | G06F 13/4282 |
| 2019/0317911 | A1* | 10/2019 | Chun | G06F 1/3237 |
| 2021/0157381 | A1* | 5/2021 | Goffman-Vinopal | G06F 1/324 |
| 2021/0224078 | A1 | 7/2021 | Busch et al. | |
| 2022/0075440 | A1* | 3/2022 | Rachakonda | G06F 1/3228 |
| 2022/0284163 | A1* | 9/2022 | Kolor | G06F 30/392 |
| 2022/0327083 | A1 | 10/2022 | Das Sharma et al. | |
| 2023/0155407 | A1* | 5/2023 | Kwak | H02J 7/855 320/134 |
| 2023/0214350 | A1* | 7/2023 | Davidov | G06F 1/3203 710/105 |
| 2023/0325086 | A1 | 10/2023 | Subramanian et al. | |
| 2024/0113914 | A1* | 4/2024 | Sambamurthy | G06F 1/3287 |
| 2024/0184355 | A1 | 6/2024 | Sodhi et al. | |
| 2025/0138623 | A1* | 5/2025 | Teh | G06F 1/3209 |
| 2025/0208682 | A1* | 6/2025 | Noguera Serra | G06F 1/28 |

FOREIGN PATENT DOCUMENTS

| | | | |
|---|---|---|---|
| CN | 116360873 | A | 6/2023 |
| CN | 116414212 | A | 7/2023 |
| KR | 101861743 | B1 | 5/2018 |
| TW | 201118548 | A | 6/2011 |

* cited by examiner

600

700

BOND-TO-BOND DIE INTERFACE

BACKGROUND

Technical Field

Embodiments described herein are related to integrated circuits (ICs) and, more particularly, to interfaces for coupling multiple chiplet ICs into a computer system.

Description of the Related Art

Computer systems may include one or more processors that serve as central processing units (CPUs) for a system, as well as graphics processing units (GPUs), neural network engines, and various other components such as memory controllers, peripheral components, and the like. In older computer systems, these various components were commonly implemented as respective integrated circuits (ICs), packaged independently and coupled together through traces on a circuit board. In newer computer systems, a system-on-a-chip (SOC) approach to design may be used in which multiple functions that were previously implemented on different ICs are integrated onto a single SOC die. Such SOC integration may reduce cost, power consumption, circuit board area, and/or increase performance.

A given SOC may be used in a variety of applications, with varying performance, cost, and power considerations. For a cost-sensitive application, for example, performance may not be as desired as cost and power consumption. On the other hand, for a performance-oriented application, cost and power consumption may not be emphasized while processing bandwidth is emphasized. Designing and manufacturing different SOCs for different applications may, however, be cost and/or schedule prohibitive. Increasing reuse of a given SOC design may, therefore, be desirable to reduce costs associated with designing, verifying, manufacturing, and evaluating a new SOC design.

A potential solution for increasing a scalability of SOC designs includes division of an SOC into one or more ICs, that can be co-packaged to form a given SOC device that, despite being comprised of a plurality of dies, function as a single SOC. Challenges for designing such a multi-die SOC may include power management across dies as well as minimizing latency for inter-die communication.

BRIEF DESCRIPTION OF THE DRAWINGS

The following detailed description makes reference to the accompanying drawings, which are now briefly described.

Figure 1:
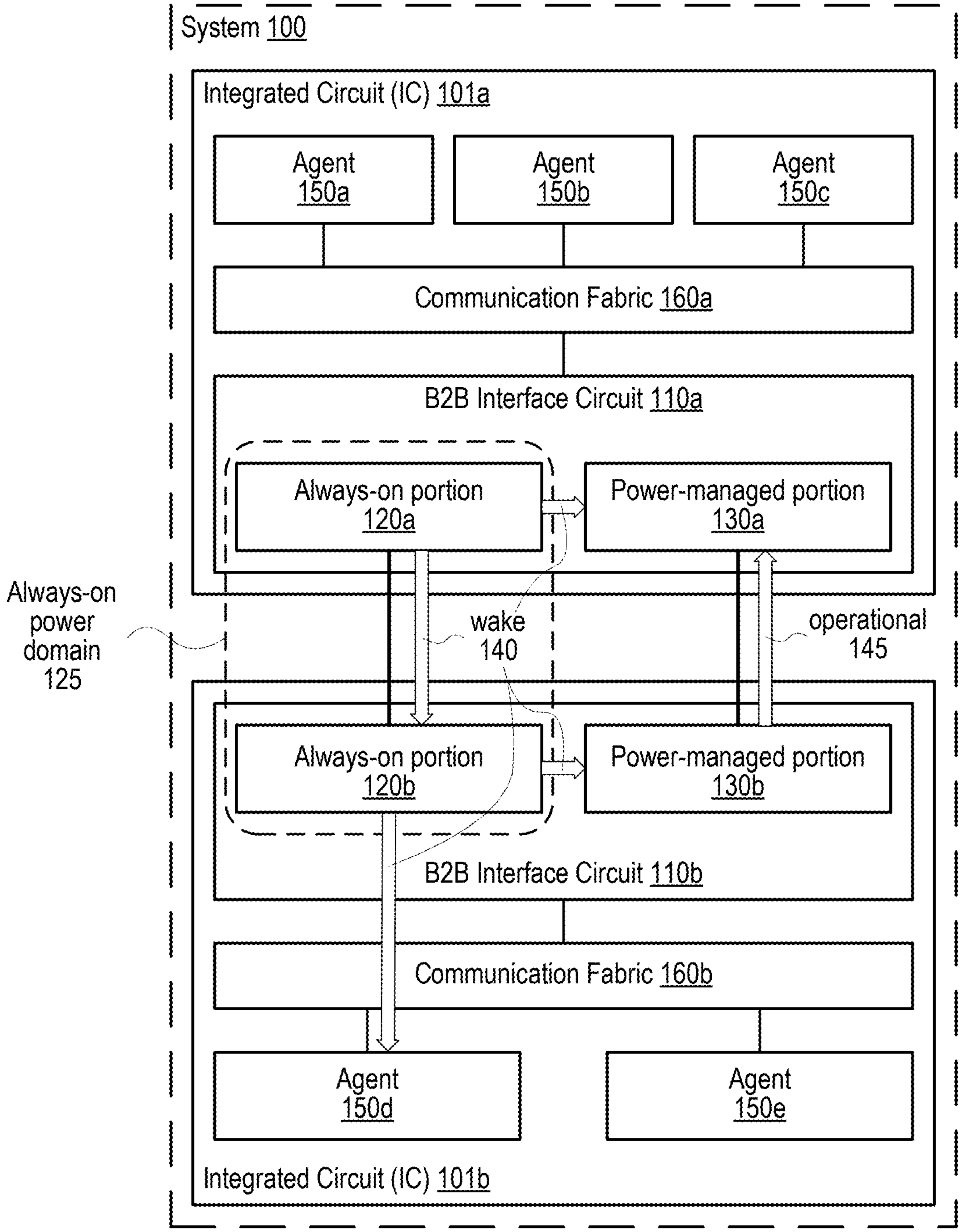
FIG. 1 illustrates a block diagram of an embodiment of a system with two integrated circuits coupled together using disclosed interface circuits.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described above, a given SOC design may be used in a variety of applications having a range of performance and cost considerations. In addition, reuse of an existing SOC design may reduce costs compared to designing, verifying, manufacturing, and evaluating a new SOC design. One technique for scaling a single SOC design across a range of applications is to utilize multiple instances of a same SOC in applications that emphasize performance over costs, and using a single instance of the SOC in the cost sensitive applications. Such a homogenous approach to SOC scaling, however, duplicates all circuits of the single SOC design when only a portion of the circuits may be desired in some applications.

Another approach to SOC design includes dividing functions of an SOC into a plurality of separate IC dies that are configured, when coupled together, to operate as a single SOC across the plurality of co-packaged IC dies. The individual dies that comprise such a multi-die SOC are referred to herein as "chiplets." It is to be understood that any SOC disclosed herein can be implemented using a chiplet-based architecture. Accordingly, wherever the term "SOC" appears in this disclosure, those references are intended to suggest embodiments in which the same functionality is implemented via a less monolithic architecture, such as via multiple chiplets, which may be included in a common chip-level package in some embodiments.

Figure 4:
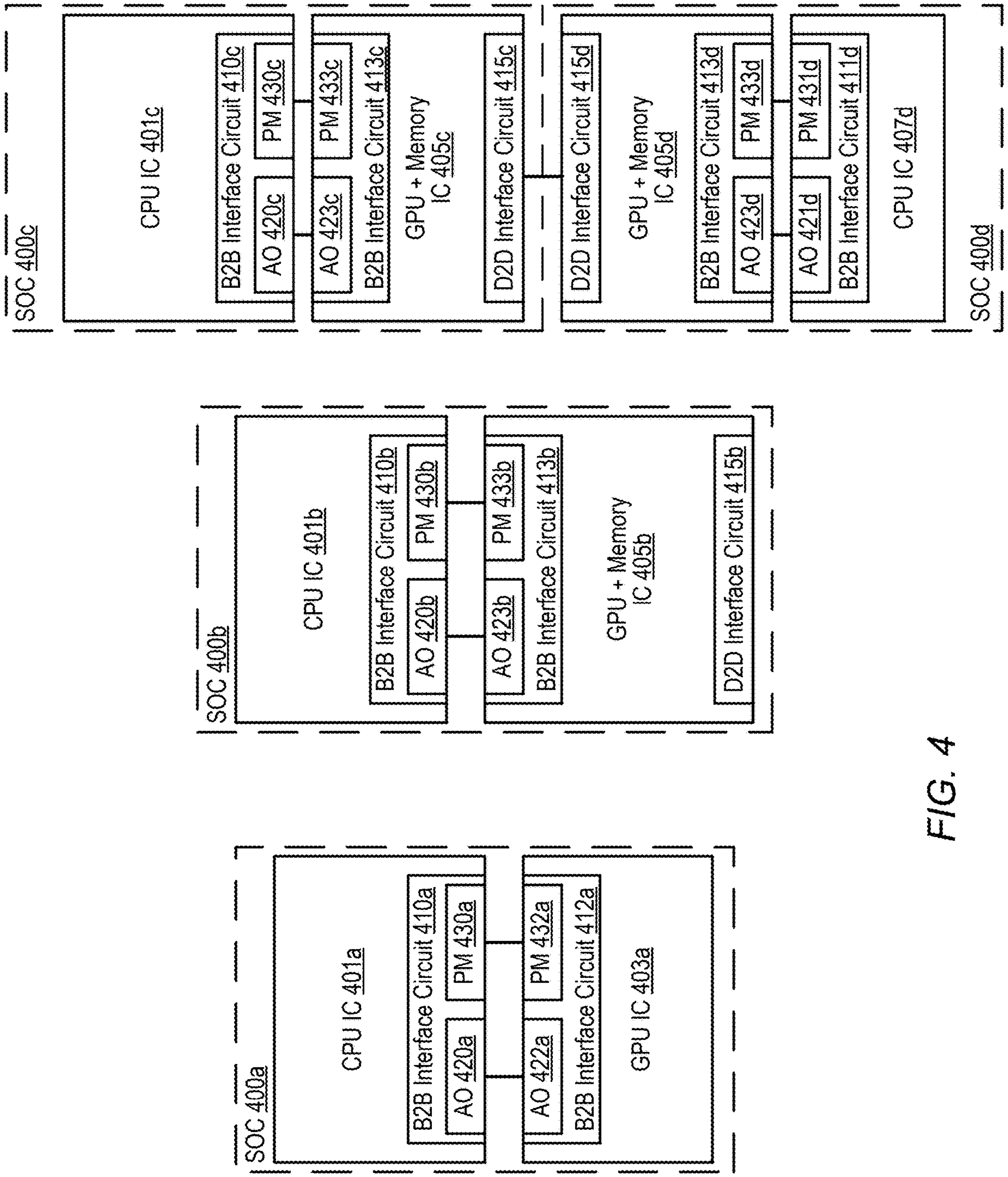
FIG. 4 illustrates block diagrams of several embodiments of a system with two or more integrated circuits coupled together using various disclosed interface circuits.

As used herein, multi-die embodiments are to be understood to encompass both homogeneous designs (in which each SOC includes identical or almost identical functionality) and heterogeneous designs (in which the functionality of each SOC diverges more considerably). Such disclosure also contemplates embodiments in which the functionality of the multiple SOCs is implemented using different levels of discreteness. For example, the functionality of a first system could be implemented on two chiplet dies, while the functionality of a second system (which could be the same or different than the first system) could be implemented using a three or more co-packaged chiplets. For example, a first chiplet SOC may include a CPU chiplet and a GPU chiplet. A second chiplet SOC may include a CPU chiplet and two GPU chiplets for increased graphics performance, two CPU chiplets and one GPU chiplet for increased execution bandwidth, or two apiece of CPU and GPU chiplets for increased code execution and graphics capabilities. Several examples are illustrated in FIG. 4 and described in more detail below.

Utilizing multiple chiplet ICs may pose several challenges as compared to a single-chip SOC. Some applications, mobile devices for example, have limited space for multiple ICs to be included. Furthermore, to reduce latency associated with inter-IC communication, a chiplet-to-chiplet (also referred to herein as a "bond pad-to-bond pad," "bond-to-bond," or simply "b2b") interface may include a large number of pins, thereby allowing a large number of bits to be exchanged, in parallel, between two or more chiplets. For example, an interface for a multi-core SOC may utilize a communication fabric that includes several network buses with hundreds or even a thousand or more signals travelling in parallel. To couple two or more of such chiplets together may require a b2b interface that provides access to a significant portion, or all, of the network buses, potentially requiring a hundred or more pins to be wired across the two or more die. In addition, to match or to even approach internal communication frequency of the communication fabric, timing characteristics of the large number of pins of the b2b interface should be consistent to avoid different bits of a same data word from arriving on different clock cycles.

The present disclosure recognizes that such b2b interfaces should support coupling two or more chiplets in a limited space and provide scalability of an SOC design to support a range of applications. Such a scalable interface may include a pin arrangement that allows for two ICs to be physically coupled with little to no crossing of wires between the two ICs when the two ICs are placed face-to-face or along a common edge of the two die. To increase consistency of performance characteristics across the pins of the interface, a single design for a smaller number of pins, e.g., sixteen, thirty-two, or the like, may be repeated until a desired number of pins for the interface are implemented. Such an b2b interface may allow a chiplet to be utilized in a wide range of applications by enabling performance increases through coupling of any number of suitable chiplets. This b2b interface may further enable the two or more ICs to be coupled together in a manner that allows the coupled ICs to be used in mobile applications or other applications in which physical space for multiple ICs is limited.

One technique for designing an IC die-to-IC die interface includes design of a single interface standard and reusing this same interface across any ICs that may be included in a multi-chip SOC. An example of such a technique is disclosed in U.S. patent application Ser. No. 17/194,003, incorporated herein by reference. While such a singular, complementary design may provide a consistent and easily reusable interface capable of coupling multiple SOCs together, the complexity for including support for coupling two instances of a same IC design may be inefficient for coupling two heterogeneous chiplets together.

An interconnect between chiplets may have different goals as compared to interconnect between complete SOCs. For example, the latency and complexity of chiplet-to-chiplet interfaces may need to be lower than that between two separate instances of an SOC die. Chiplets included in a multichip SOC may not be instances of a same design, but may instead be heterogeneous (e.g., one chiplet has CPUs and input/output interfaces, and the other die has GPUs, memory peripherals, and the like). Various embodiments of a b2b interface that supports both intra-chiplet communication within a multichip SOC, as well as supporting an inter-SOC communication is disclosed herein.

For example, such a multi-chiplet SOC embodiment may include a first chiplet having a first set of agent circuits and a second chiplet having a second set of agent circuits. The two chiplets may include respective b2b interfaces, each having an always-on portion and a power-managed portion. When the two chiplets are coupled via the two b2b interfaces, a first agent circuit in the first chiplet may send a transaction to a second agent circuit in the second chiplet, via the b2b interfaces. This transaction may be ready to send while the second chiplet is in a reduced power state in which the second agent circuit is in a powered-down state. The first interface may, therefore, be configured to communicate, via the always-on portions of the b2b interfaces, with the second chiplet to cause the second chiplet to wake up the second agent circuit in order to receive the transaction.

FIG. 1 illustrates a block diagram of an embodiment of a system that includes two instances of an IC coupled via respective bond-to-bond interfaces. As illustrated, system 100 includes integrated circuits (ICs) 101*a* and 101*b* (collectively ICs 101), coupled to one another via respective b2b interface circuits 110*a* and 110*b* (collectively b2b interface circuits 110). Each of ICs 101 includes a respective plurality of agent circuits 150, agent circuits 150 in IC 101*a* and agent circuits 150*d*-150*e* in IC 101*b*. Each of ICs 101 further includes a respective one of communication fabrics 160*a* and 160*b* (collectively 160). In addition, each of b2b interface circuits 110 includes a respective one of always-on portions 120 and power-managed portion 130.

As illustrated, system 100 is a chiplet-based computer system implemented on a plurality of co-packaged integrated circuits that includes IC 101*a* having agent circuits 150*a*-150*c* and IC 101*b* having agent circuits 150*d* and 150*e*. ICs 101 are heterogeneous chiplets that are coupled together to perform in system 100 as a single integrated SOC. System 100 may be included in any suitable type of computer device, such as a desktop or laptop computer, a smartphone, a tablet, a wearable device and the like.

IC 101*a* includes b2b interface circuit 110*a* with always-on portion 120*a* and power-managed portion 130*a*. IC 101*a* may perform any particular function with a finite amount of bandwidth. For example, IC 101*a* may be a general-purpose microprocessor or microcontroller, a digital-signal processor, a graphics or audio processor, or other type of chiplet. In some applications, a single instance of IC 101*a* may provide suitable performance bandwidth for its corresponding functions. In other applications, multiple instances of IC 101*a* may be included in system 100 to increase performance bandwidth.

IC 101*b* includes b2b interface circuit 110*b* coupled to b2b interface circuit 110*a*. As shown, b2b interface circuit includes always-on portion 120*b*, coupled to always-on portion 120*a*, and power-managed portion 130*b*, coupled to power-managed portion 130*a*. In a similar manner as IC 101*a*, IC 101*b* may perform a different one of the above disclosed functions, with a respective amount of bandwidth. The always-on and power-managed portions of b2b interface circuits 110 may be configured to enable multiple ICs 101 to be configured as a single system in which the existence of multiple integrated circuits is transparent to software executing on the single system. For example, IC 101*a* may be a general-purpose microprocessor while IC 101*b* is a graphics processor, combining to provide system 100 with general application execution capabilities as well as image processing capabilities.

As illustrated, ICs 101 each include a respective one of communication fabrics 160. Communication fabric 160*a* in IC 101*a* is coupled to agent circuits 150*a*-150*c* within system 100, while communication fabric 160*b* in IC 101*b* is coupled to agent circuits 150*d* and 150*e* within system 100.

B2B interface circuits 110 are used to couple communication fabric 160*a* to communication fabric 160*b*, and to couple the two communication fabrics 160 such that an agent circuit 150 in IC 101*a* can communicate with a different agent circuit 150 in IC 101*b* (and vice versa) as if IC 101*a* and 101*b* were a single integrated circuit.

For example, agent circuit 150*a* in IC 101*a* may be configured to send, while IC 101*b* is in a reduced power state in which agent circuit 150*d* is in the reduced power state, a transaction to agent circuit 150*d*, via b2b interface circuit 110*a*. As an example, agent circuit 150*a* may be a processor circuit executing an application that causes an audio file to be played via speakers coupled to system 100. Agent circuit 150*d* may be an audio processor configured to receive the audio file and generate appropriate analog signals for driving the speakers. If no audio was previously playing, then agent circuit 150*d* may be placed in the reduced power state. Furthermore, if there has not been recent communication between IC 101*a* and IC 101*b*, then power managed portions of b2b interface circuits 110 may both be in respective reduced power states.

After receiving an indication from agent circuit 150*a* that a transaction is ready to send agent circuit 150*d*, b2b interface circuit 110*a* may be configured to communicate, via always-on portion 120*a*, with IC 101*b* to cause the second IC to wake up the second agent circuit. Despite IC 101*b* being in the reduced power state, always-on portion 120*b* remains active and ready to receive requests from always-on portion 120*a*. It is noted that, as used herein, an "always-on" circuit refers to a circuit in an IC that is powered via an unswitched power signal. That is, if power is removed from the IC, then an always-on circuit will loose power, and therefore, no longer be active. In contrast, a "power-managed" circuit, as used herein, refers to a circuit in an IC that is powered via a switchable power signal, wherein the power signal may be switched off to reduce power consumption when circuits coupled to the switchable power signal are idle. Switchable power signals are typically controlled by a power management circuit (not shown).

B2B interface circuit 110*a* may be further configured to cause the power-managed portions 130*a* and 130*b* of b2b interface circuits 110*a* and 110*b* (respectfully) to wake. For example, upon receiving the indication from agent circuit 150*a*, always-on portion 120*a* may be configured to assert wake signal 140 to power-managed portion 130*a* within b2b interface circuit 110*a* and to always-on portion 120*b* of b2b interface circuit 110*b*. Always-on portion 120*b* may be configured to forward wake signal 140 to power-managed portion 130*b* within b2b interface circuit 110*b*, as well as to agent circuit 150*d*. In some embodiments, always-on portion 120*b* may forward wake signal 140 to a power management circuit in IC 101*b* which, in turn, restores power and/or clock signals to power-managed portion 130*b* and agent circuit 150*d* as necessary.

In some embodiments, in response to wake signal 140, agent circuit 150*d* and/or power-managed portion 130*b* may send operational signal 145 back to b2b interface circuit 110*a*, via power-managed portion 130*a*, as shown, and/or via always-on portion 120*a*. B2b interface circuit 110*a* may be configured to receive operational signal 145 indicating that power-managed portion 130*b* of b2b interface circuit 110*b* and agent circuit 150*d* are operational, and subsequently use power-managed portions 130*a* and 130*b* to transmit the transaction to agent circuit 150*d*. In other embodiments, b2b interface circuit 110*a* may not wait for an indication from power-managed portion 130*b* in order to transmit the transaction. For example, b2b interface circuits 110 may be configured to wait for a determined amount of time after wake signal 140 is sent, and then transmit the transaction without any handshaking. Such a determined amount of time may be dynamically calculated based on current operating conditions (e.g., power supply voltage levels, clock rates, system temperature, and the like).

By utilizing the always-on portions of the b2b interface circuits as described above, a chiplet interface may be implemented on integrated circuits that reduces latency during inter-chiplet communications, even when a destination of a transaction is in an inactive, reduced power state. Such capabilities may enable creation and use of a chiplet-based computer system that matches performance of single-chip computer systems while providing design flexibility via use of various combinations of chiplet ICs.

It is noted that system 100, as illustrated in FIG. 1, is merely an example. The illustration of FIG. 1 has been simplified to highlight features relevant to this disclosure. Various embodiments may include different configurations of the circuit elements. For example, additional elements may include power and/or clock management circuits. Although a single b2b interface circuit is shown per IC, in other embodiments, any suitable number of b2b interface circuits (and/or other external interface circuits) may be included. Although only two integrated circuits are shown, it is contemplated that additional ICs may be included in other embodiments. In various embodiments, circuits of system 100 may be implemented using any suitable combination of sequential and combinatorial logic circuits. In addition, register and/or memory circuits, such as SRAM, may be used in these circuits to temporarily hold information such as instructions, data, address values, and the like.

The b2b interface circuits of the chiplet-based system illustrated in FIG. 1 are shown with minimum detail for clarity. Such b2b interface circuits may be implemented in a variety of fashions. An example of a chiplet-based computer system using two different versions of a b2b interface circuit is shown in FIG. 2.

Figure 2:
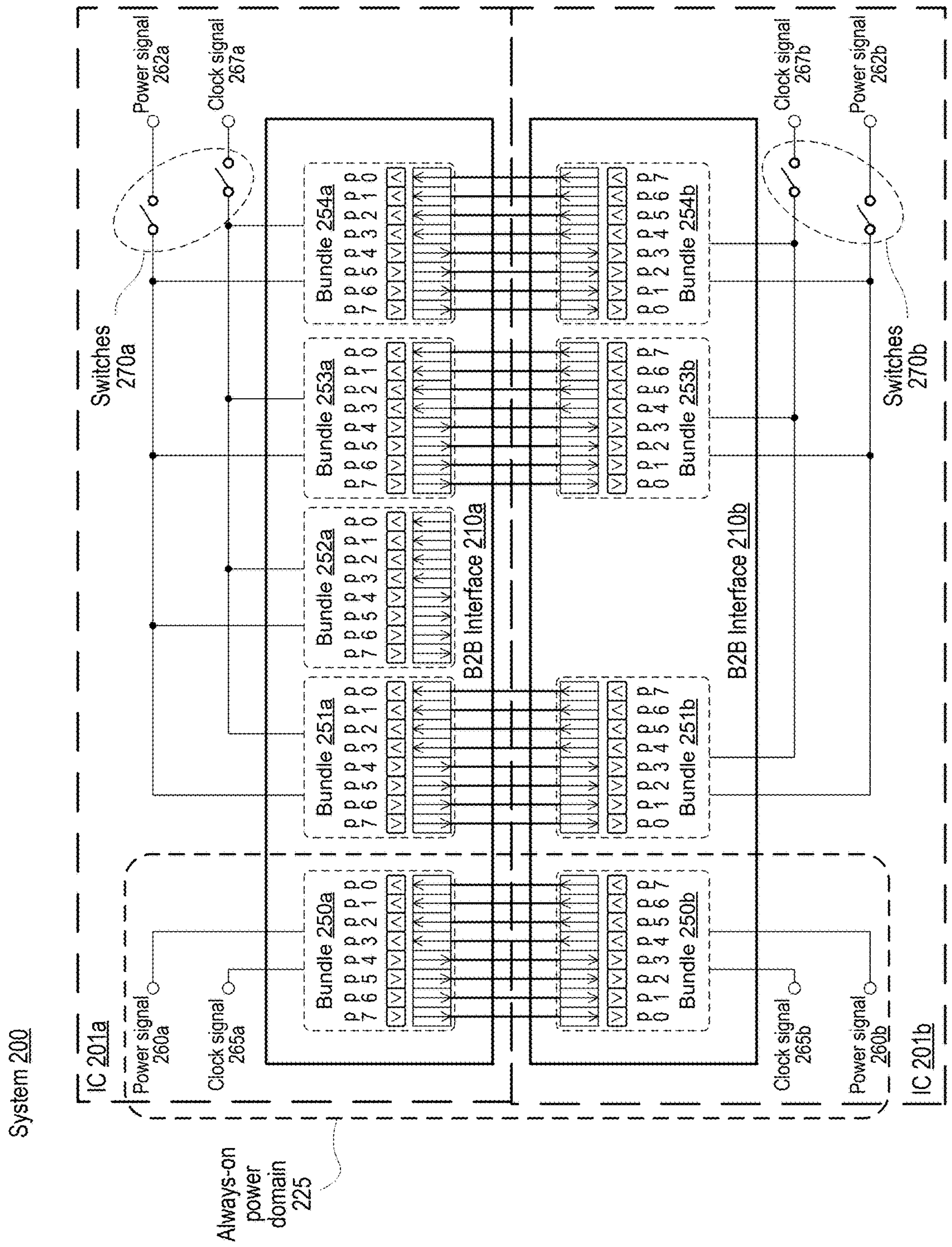
FIG. 2 shows a block diagram of another embodiment of a system with two integrated circuits coupled together using disclosed interface circuits having a plurality of pin bundles.

Moving to FIG. 2, a block diagram of an embodiment of a computer system using two heterogeneous chiplets with different versions of a b2b interface circuit is shown. As illustrated, system 200 includes two chiplets, IC 201*a* coupled to IC 201*b* via b2b interface circuits 210*a* and 210*b* (collectively 210), respectively. In a manner similar to system 100 of FIG. 1, system 200 is configured to operate as a single system-on-chip computer system. In some embodiments, system 200 corresponds to system 100 of FIG. 1, similarly named and numbered elements operating as described above, with exceptions as noted below. Each of b2b interface circuits 210 includes a respective number of pin bundles, bundles 250*a*-254*a* in b2b interface circuit 210*a* and bundles 250*b*, 251*b*, 253*b*, and 254*b* in b2b interface circuit 210*b*.

As illustrated, b2b interface circuits 210 may include various combinations of bundles 250-254 to supporting different interface functions. For example, b2b interface circuit 210*a* includes bundle 250*a* which may include various pins for always-on communication and system control signals, as well as bundles 251*a*-254*a* to support various agent-to-agent communication protocols. Similarly, b2b interface circuit 210*b* includes bundle 250*b*, including various pins for always-on communication and system control signals, as well as bundles 251*b*, 253*b*, and 254*b* to support various agent-to-agent communication protocols. Bundles in b2b interface circuit 210*a* may be coupled to bundles in b2b interface circuit 210*b* that have corresponding functions. It is noted that b2b interface circuit 210*b* does not include a bundle coupled to bundle 252a of b2b interface circuit 210a. In some embodiments, such a bundle that is not coupled to a corresponding bundle of b2b interface circuit 210b may be disabled, e.g., by blowing a fuse or dynamically via a software-based configuration.

In various embodiments, bundles 251-254 may correspond to respective interface protocols. For example, bundles 251 may support a communication protocol used for accessing memory circuits, while bundles 254 support interprocessor communication, and so forth. Bundle 252a may support a secure encryption protocol that is not supported in IC 201b, and hence, is left uncoupled. Individual bundles may have a plurality of pins that are arranged in a symmetrical orientation such that bundles 251a and 251b may reuse a same interface bundle design without any changes. As shown, both bundles 251a and 251b include 8 pins 0-7, with pins 0-3 being receive pins and pins 4-7 being transmit pins. Transmit signals on pins 7-4 correspond to respective receive signals on pins 0-3, thereby allowing a straight pin-to-pin connection when the two instances of bundle 251 are turned 180 degrees from one another as depicted.

As illustrated, system 200 includes always-on power domain 225 that encompasses bundles 250a and 250b. Always-on bundles 250a and 250b are coupled, respectively to power signals 260a and 260b and clock signals 265a and 265b. In some embodiments, power signals 260a and 260b may be supplied from a common power source external to ICs 201a and 201b, e.g., via one or more power management circuits (not shown) included in, or coupled to, ICs 201. In other embodiments, power signal 260a may be coupled directly to one pin of bundle 250a which, in turn, may be coupled directly to a corresponding pin in bundle 250b, thereby supplying power signal 260a to IC 201b as power signal 260b. Power signals 260a and 260b may always provide at least a minimum operational voltage level as long as system 200 is powered. Any power management circuits involved in setting the voltage levels of power signals 260a and 260b may, therefore, be configured to maintain these voltage levels at a level that meets or exceeds the minimum operational voltage level, thereby allowing all circuits in always-on power domain to remain functional for as long as system 200 receives power.

Similarly, clock signals 265a and 265b are provided bundles 250a and 250b, respectively. In a similar manner as power signals 260a and 260b, clock signals 265a and 265b may be provided by respective clock circuits included in, or coupled to, each of ICs 201. In other embodiments, clock signal 265a may be coupled directly to a pin in bundle 250a, which, in turn, is coupled to a respective pin in bundle 250b allowing clock signal 265a to be sent to IC 201b as clock signal 265b. In embodiments in which clock signals 265a and 265b are derived from different sources, the two clock signals may be synchronized. In other embodiments, no synchronization may occur between the two clock signals. Also similar to power signals 260a and 260b, associated clock management circuits may be configured to maintain at least a minimum operational frequency for clock signals 265a and 265b. Since associated clock and power management circuits are unable to switch power and/or clock signals off for always-on power domain 225, always-on power domain may also be referred to as a "power-unmanaged"domain.

In some embodiments, signals on at least a portion of pins in bundles 250a and 250b may be synchronous to clock signals 265a and 265b, respectively. Other signals in a remaining portion of pins in bundles 250a and 250b may be asynchronous to these clock signals. For example, each of bundles 250a and 250b may include pins associated with always-on communication between ICs 201a and 201b. These pins may be synchronous to clock signals 265a and 265b. Bundles 250a and 250b may also include one or more pins associated with system control signals in which at least a portion of these system control signals are asynchronous to clock signals 265a and 265b.

As shown, b2b interface circuits 210a and 210b each include a plurality of pin bundles that are coupled to different power and clock signals. Bundles 251a-254a in b2b interface circuit 210a are coupled to power signal 262a and clock signal 267a. Similarly, bundles 251b, 253b, and 254b of b2b interface circuit 210b are coupled to power signal 262b and clock signal 267b. Like power signals 260a and 260b and clock signals 265a and 265b, power signals 262a and 262b and clock signals 267a and 267b may be managed by one or more power and clock management circuits. Unlike the power and clock signals of always-on power domain 225, power signals 262a and 262b and clock signals 267a and 267b may be reduced to sub-operational levels and/or gated off completely, e.g., via opening of switches 270a and 270b. Although illustrated as one gate per signal, multiple gates may be implemented to allow respective ones of bundles 251a-254a, 251b, 253b, and 254b to be enabled or disabled independently. For example, bundles 251a and 251b may be coupled to respective memory buses in each of ICs 201a and 201b while bundles 254a and 254b are coupled to respective peripheral circuit buses. If memory circuits on both ICs 201a and 201b are active, but peripheral circuits on IC 201a and/or 201b are idle, then bundles 251a and 251b may remain powered and clocked for operation while bundles 254a and 254b may be placed into idle or power-down states. If an agent circuit in IC 201a has a transaction that needs to be sent to an idle peripheral circuit in IC 201b, then the techniques described above may be employed, using bundles 250a and 250b to respectively wake bundles 254a and 254b, as well as wake the destination peripheral circuit in IC 201b.

It is noted that the embodiment of FIG. 2 is an example of a b2b interface capable of implementing the disclosed techniques. In other embodiments, a different combination of elements may be included. For example, the always-on power domain may include more than a single pin bundle per IC. Additionally, such extra pin bundles may not be placed adjacent to one another. In some embodiments, multiple pin always-on pin bundles may be placed at opposite ends of a b2b interface circuit. Although FIG. 2 depicts five and four pin bundles in each of ICs 201a and 201b, respectively, any suitable number of pin bundles may be included in each of b2b interface circuits 210. Furthermore, although each pin bundle is shown with eight pins each, any suitable number of pins may be included in each b2b interface circuit, and respective bundles may include different numbers of pins.

In the description of FIGS. 1 and 2, systems 100 and 200 are each shown with two ICs. It is contemplated that some systems may include more than two ICs. An embodiment of a system that includes four ICs is shown in FIG. 3.

Figure 3:
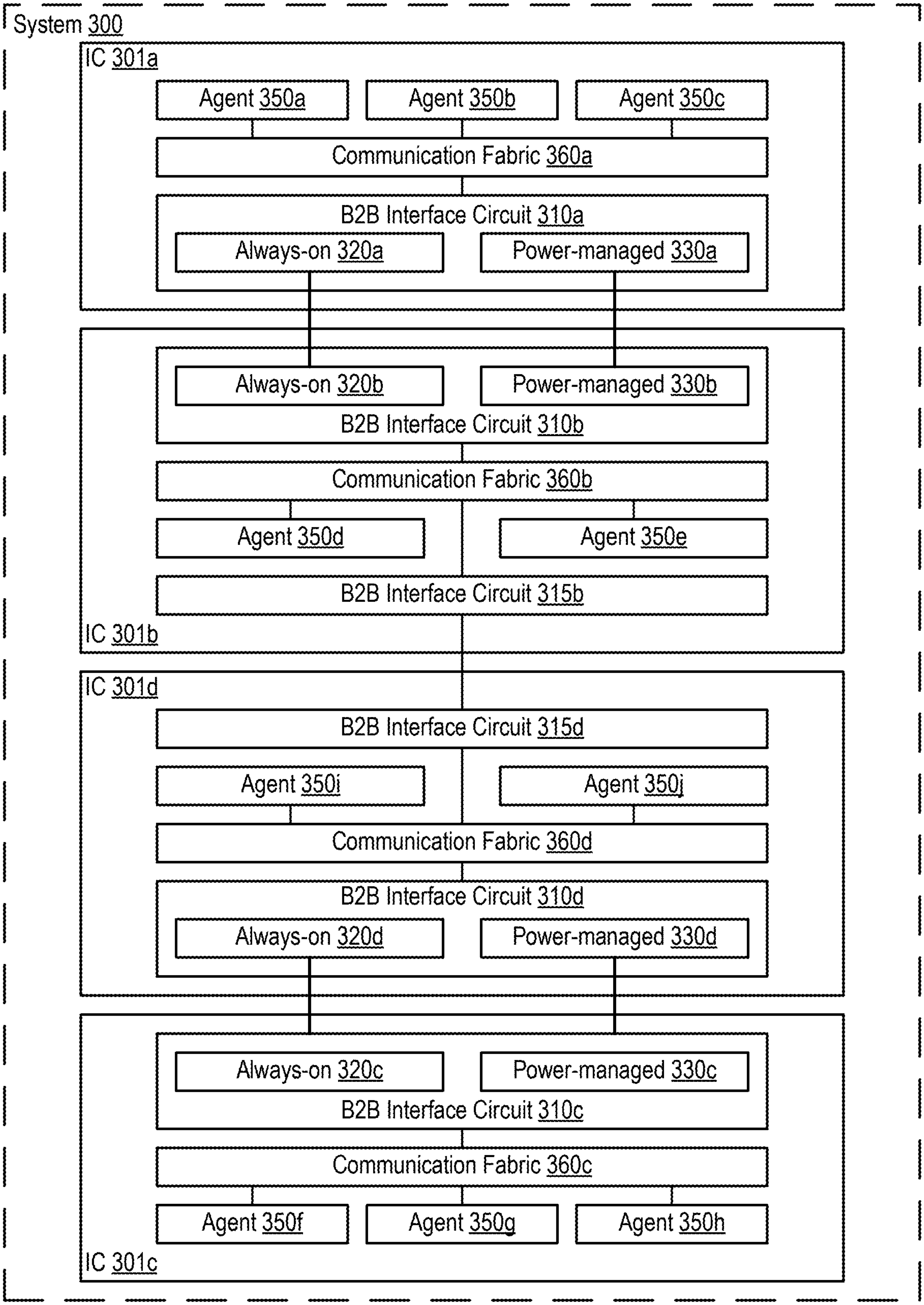
FIG. 3 depicts a block diagram of an embodiment of a system with four integrated circuits coupled together using various disclosed interface circuits.

Turning to FIG. 3, an embodiment of a system that includes four chiplet IC dies is shown, each of the ICs including at least one respective b2b interface circuit as described above. System 300 includes four integrated circuits, ICs 301a-301d (collectively 301). ICs 301a and 301c are both similar to IC 101a in FIG. 3. In some embodiments, ICs 301a and 301c may be two instances of a same chiplet design, while in other embodiments, they may be heterogeneous designs. ICs 301b and 301d are similar to IC 101b in FIG. 1. Each of ICs 301 includes a respective one of b2b interface circuits 310*a*-310*d* (collectively 310). However, each of IC 301*b* and 301*d* further include an additional one of b2b interface circuits 315*ba* and 315*d* (collectively 315), respectively. Elements included in each of the ICs 301 may function as described above for similarly named and numbered elements in FIGS. 1 and 2, with exceptions as noted below. In some embodiments, all four ICs 301 may be co-packaged to function as a single SOC, with bond wires attached either directly from chip-to-chip, or with one or more die interposers included between two or more of the dies. In other embodiments, IC 301*a* and 301*b* may be co-packaged as a first SOC and IC 301*c* and 301*d* may be co-packaged as a second SOC, with the first and second SOCs coupled via b2b interface circuits 315.

As illustrated, ICs 301*a* and 301*b* are coupled to one another via b2b interface circuits 310*a* and 310*b*, and ICs 301*c* and 301*d* are coupled to one another via b2b interface circuits 310*c* and 310*d*. As previously disclosed, each of b2b interface circuits 310 include a respective one of always-on portion 320*a*-320*d* and a respective one of power-managed portions 330*a*-330*b*. IC 301*b* may be configured to, based on a signal for IC 301*b* to enter a reduced power mode, power down power-managed portion 330*b* of b2b interface circuit 310*b*, and then enter the reduced power mode. To enter the reduced power mode, IC 301*b* may, in various cases, cause agent circuit 350*d* and/or agent circuit 350*e* to enter an idle state (including, optionally, power-gating some or all of the idle agent circuits). Based on the signal for IC 301*b* to enter the reduced power mode, IC 301*a* may be configured to power down power-managed portion 330*a* of b2b interface circuit 310*a*.

While IC 301*b* is in the reduced power mode, IC 301 may determine that one of agent circuits 350*a*-350*c* has a transaction to send is ready to be sent to IC 301*b*. Based on this determination, IC 301*a* may be further configured to use always-on portion 320*a* of b2b interface circuit 310*a* to assert a wake signal to IC 301*b* while power-managed portion 330*a* of b2b interface circuit 310*a* is powered down. Subsequently, IC 301*b* may be further configured to receive the wake signal via always-on portion 320*b* of b2b interface circuit 310*b*. IC 301*b* may be further configured to, based on receiving the wake signal, exit the reduced power mode, and restore power to power-managed portion 330*b* of b2b interface circuit 310*b*. It is noted that although IC 301*a* is disclosed as waking IC 301*b*, IC 301*a* may be configured to enter a power down state, and IC 301*b* may be configured to wake IC 301*a* using always-on portion 320*b*.

In a similar manner as described for ICs 301*a* and 301*b*, ICs 301*c* and 301*d* may be configured to enter and exit reduced power modes using corresponding always-on portions 320*c* and 320*d* of b2b interface circuits 310*c* and 310*d*. Accordingly, such an embodiment may allow for any one (or any combination of two or more) of ICs 301 to enter a reduced power state as workloads allow, thereby enabling a flexible solution for reducing a power consumption of system 300.

As shown, ICs 301*b* and 301*d* further include b2b interface circuits 315*b* and 315*d*, respectively, that are different from b2b interface circuits 310. B2B interface circuits 315 may be configured to enable communication between ICs 301*b* and 301*d* and, therefore, support communication between any two or more of ICs 301 via any appropriate combinations of b2b interface circuits 310 and 315. Thus, these combinations of b2b interface circuits 310 and 315 may allow system 300 to function as a single unified SOC, for example, as a main application processor in a computing device, such as a laptop or desktop computer, a tablet computer, a smartphone, and the like.

As used herein, a "single unified SOC" refers to an SOC implemented on a single IC as well as to a plurality of co-packaged chiplet circuits that are configured to execute program instructions included in a software program that causes processor circuits in the SOC and/or various chiplets to receive, process, and generate data utilizing one or more memory circuits and/or other functional circuits accessed via a common bus protocol. When implemented across multiple chiplet ICs, as shown in FIGS. 1-4, one or more common bus protocols may be used across the multiple chiplets to allow software programs to access agents on the various ICs without an awareness of a physical location of the agents. Accordingly, b2b interface circuits 310 and 315 may couple the respective communication fabrics 360 into a common fabric of networks, thereby enabling agent circuits 350*f* on IC 301*c*, for example, to communicate to any of agent circuits 350 on ICs 301*a*, 301*b*, and 301*d* in a same manner as communicating to agent circuits 350*g* and 350*h* within IC 301*c*.

In some embodiments, IC 301*d* may be a different instance of IC 301*b*. In such embodiments, b2b interface circuits 315*b* and 315*d* are different instances of a same b2b interface circuit design. Accordingly, b2b interface circuits 315 may be configured to be coupled, via a set of wires, to one another around a common axis of symmetry without crossing any of the set of wires. It is noted that b2b interface circuits 310 may not have such symmetry.

It is noted that system 300 of FIG. 3 merely demonstrates disclosed concepts. System 300 has been simplified to clearly illustrate the described elements for implementing the described system. In other embodiments, additional elements may be included. For example, a single line is drawn between the various pairs of always-on and power-managed portions of b2b interface circuits 310 as well as a single line between b2b interface circuits 315. These lines may represent tens, hundreds, or even thousands of wires connecting any respective pair of interface circuits.

FIG. 3 disclose various combinations of chiplet ICs coupled together to form a single unified SOC. Use of such a chiplet IC strategy, combined with the use of the disclosed b2b interface circuits, may enable a wide range of possible SOCs. FIG. 4 illustrates several examples of such.

Proceeding to FIG. 4, several block diagrams of a variety of embodiments of SOCs implemented using respective pluralities of chiplets is shown. SOCs 400*a*, 400*b*, 400*c*, and 400*d* (collectively 400) each are shown with two chiplet ICs, a central processor unit (CPU) and a graphic processor unit (GPU). The four depicted SOCs 400 demonstrate how a b2b interface circuit can be used to support a wide variety SOC designs using various combinations of CPU and GPU chiplet ICs. Theses SOCs may be implemented by co-packaging the illustrated chiplet dies in a single IC package, utilizing direct bond pad to bond pad wire bonding, an interposer die, and the like. In other embodiments, the illustrated dies may be placed directed to a common circuit board and wired either bond pad to bond pad or via traces on the circuit board. It is noted that for the descriptions of the elements of FIG. 4, elements with a same name and reference number with only a different letter suffix indicates a different instance of common circuit design. A different numeric portion of the reference is intended to indicate a different design from a similarly named element.

SOC 400*a* includes CPU IC 401*a* and GPU IC 403*a*. CPU IC includes b2b interface circuit 410*a* that further includes always-on portion (AO) 420*a* and power-managed (PM)

portion 430*a*. In a similar manner, GPU IC 403*a* includes b2b interface circuit 412*a* that further includes AO portion 422*a* and PM portion 432*a*. In some embodiments, b2b interface circuit 412*a* may be a different, but compatible, design from b2b interface circuit 410*a*. Using different designs for each of b2b interface circuits 410*a* and 412*a* may allow each interface to be optimized for various combinations of size, power consumption, and functionality. As presented above, use of AO portions 402*a* and 422*a* as well as PM portions 430*a* and 432*a* may allow power management circuits in CPU IC 401*a* and/or GPU IC 403*a* to manage power of the interface between the two ICs while maintaining an always-on portion that reduces latency when CPU IC 401*a* has to wake GPU IC 403*a*, or vice versa. This reduced latency may further support operation of the two chiplets in SOC 400*a* to function as a single-chip computer system.

SOC 400*b* illustrates how a different instance of the same CPU chiplet design may be coupled with a different GPU chiplet design to provide different functionality. SOC 400*b* includes CPU IC 401*b* which, in the present example, is a different instance of the same chiplet design as CPU IC 401*a*. SOC 400*b* also includes GPU+memory IC 405*b*. GPU+memory IC 405*b* includes a different interface design, b2b interface circuit 413*b*, which, while different from b2b interface circuit 412*a*, may also be compatible with b2b interface circuit 410*b*. For example, as described above in regard to FIG. 2, a first b2b interface circuit may not include all (or more include more) pin bundles than a b2b interface circuit with which it is coupled. GPU+memory IC 405*b* may include additional circuits such as an external memory interface that GPU IC 403*a* may not include. Accordingly, b2b interface circuit 413*b* may include one or more pin bundles that, when coupled to similar pin bundles in b2b interface circuit 410*b*, may allow agent circuits in CPU IC 401*b* to utilize the additional external memory interface as if the external memory interface were included in CPU IC 401*b*. GPU+memory IC 405*b* further includes die-to-die (d2d) interface circuit 415*b* which may be configured to enable SOC 400*b* to be coupled to a different SOC that has a same d2d interface circuit 415.

SOCs 400*c* and 400*d* illustrate such a computer system. SOC 400*c*, as shown, is another instance of SOC 400*b*, including CPU IC 401*c* and GPU IC+memory IC 405*c*. SOC 400*c* is shown coupled to SOC 400*d* which includes a different instance of GPU+memory IC 405*d* and a different CPU IC 407*d*. SOCs 400*c* and 400*d* are coupled via d2d interface circuits 415*c* and 415*d*. Since GPU+memory IC 405*c* and GPU+memory IC 405*d* are different instances of a same design, d2d interface circuits 415*c* and 415*d* may have a symmetric design such that any transmit pin on one side of an axis of symmetry of the interface are coupled to a respective receive pin that is configured to receive signals sent via the transmit pin. Such a symmetric pin arrangement may allow d2d interface circuits 415*c* and 415*d* to be coupled using wires that do not cross one another.

Chiplet ICs may be designed to be coupled to different chiplet designs, such as CPU IC 401*a* to GPU IC 403*a*, rather than to multiple instances of the same die. This may eliminate a need for symmetry around an axis of symmetry as described for d2d interface circuits 415. Pin symmetry within a bundle may be maintained, but asymmetry in the overall b2b interface circuits may not be needed. For example, the always-on portion may be placed on one end of b2b interface circuit 410*a* and on the opposite end of b2b interface circuit 412*a*. On the other end of b2b interface circuit 410*a*, a control interface pin bundle may be placed which, in turn, may be placed on the opposite end of b2b interface circuit 412*a*. For each chiplet design, pin bundles may be instantiated in respective positions in each b2b interface circuit design such that, when compatible chiplets are packaged together, the correct bundles will line up with each other even though there is asymmetry in the respective b2b interface circuits. In contrast, the d2d interface circuit design may be symmetrical so an SOC based on a particular chiplet set can be rotated 180 degrees and connected to another SOC using the same chiplet set. D2d interface circuits 415 may, in some embodiments, also include an always-on portion, e.g., for one or more control signals. An always-on portion in such embodiments may be need to be physically placed in complementary positions relative to the axis of symmetry of d2d interface circuits 415, which may complicate pin layout and limit flexibility in design.

In some embodiments, d2d interface circuits 415 may include, or be coupled to, network interface circuits placed between the d2d interface circuit and respective communication fabrics. These network interfaces may, for example, provide any needed decoding or translation of addresses of transactions received via the d2d interface circuit from another SOC. Accordingly, the network interfaces may include buffers for temporarily storing data packets while such translations are performed. Such network interface circuits may increase latency, power consumption, die size and so forth.

To reduce latency, power consumption, and die size on chiplet designs, network interfaces between b2b interface circuits and the communication fabrics may be eliminated from the b2b interface circuit designs. Since a first type of chiplet may be designed to work with a second (and third, fourth, etc.) type of chiplet, network protocols and address maps may be standardized to avoid repetition across the various chiplet designs, thereby eliminating a need for network interfaces with the b2b interface circuits to be decoded/translated. Two instances of a same SOC, in contrast, may have duplicate versions of a physical address map, resulting in cross-SOC transactions possibly requiring address translation when entering the destination SOC from the source SOC.

It is noted that SOCs shown in FIG. 4 are merely examples of chiplet-based SOCs. Although CPU and GPU chiplet ICs are shown, respective chiplets may include any suitable functionality, including, for example, audio processors, artificial intelligence engines, cryptography/security engines, wireless communication transceivers, and the like. Although the illustrated chiplets are shown with a single b2b interface circuit, it is contemplated that a given chiplet design may include a plurality of b2b interface circuits (with similar or different designs) for coupling to a plurality of homogeneous or heterogeneous chiplets.

To summarize, various embodiments of an apparatus may include a chiplet-based computer system implemented on a plurality of co-packaged integrated circuits (ICs) that includes a first IC having a first set of agent circuits and a second IC having a second set of agent circuits. The first IC may include a first interface with a first always-on portion and a first power-managed portion. The second IC may include a second interface coupled to the first interface, the second interface having a second always-on portion and a second power-managed portion. A first agent circuit of the first set of agent circuits in the first IC may be configured to send, while the second IC is in a reduced power state in which a second agent circuit of the second set of agent circuits is in the reduced power state, a transaction to the second agent circuit, via the first interface. The first interface may be configured to communicate, via the always-on portions of the first and second interfaces, with the second IC to cause the second IC to wake up the second agent circuit.

In a further example, the first interface may also be configured to cause the power-managed portions of the first and second interfaces to wake, and to receive a signal indicating that the power-managed portions of the second interface and the second agent circuit are operational. The first interface may be further configured to use the power-managed portions of the first and second interfaces to transmit the transaction to the second agent circuit.

In an example, the first IC may include a first communication fabric coupled to the first set of agent circuits within the computer system, and the second IC may include a second communication fabric coupled to the second set of agent circuits within the computer system. In a further example, the first IC may include a central processor unit (CPU), while the second IC may include a graphic processor unit (GPU).

In an example, the first always-on portion may include a first pin bundle that is coupled to a first power supply signal and a first clock signal. The first power-managed portion may include a second pin bundle that is coupled to a second power supply signal and a second clock signal that are different from the first power signal and first clock signal.

In another example, the first and second interfaces may include respective sets of pin bundles, ones of the pin bundles supporting given interface functions. In a further embodiment, the first interface may include respective pin bundles for the always-on communication, system control signals, and a first number of agent-to-agent communication protocols. In an example, the second interface may include respective pin bundles for the always-on communication, system control signals, and a second number of agent-to-agent communication protocols, wherein the second number is less than the first number.

In a further example, the always-on communication bundle may include a pin for a clock signal and signals on the other pins in the always-on communication bundle may be synchronous to the clock signal. In another example, the system control signals bundle may include at least a portion of system control signals that are asynchronous.

Figure 5:
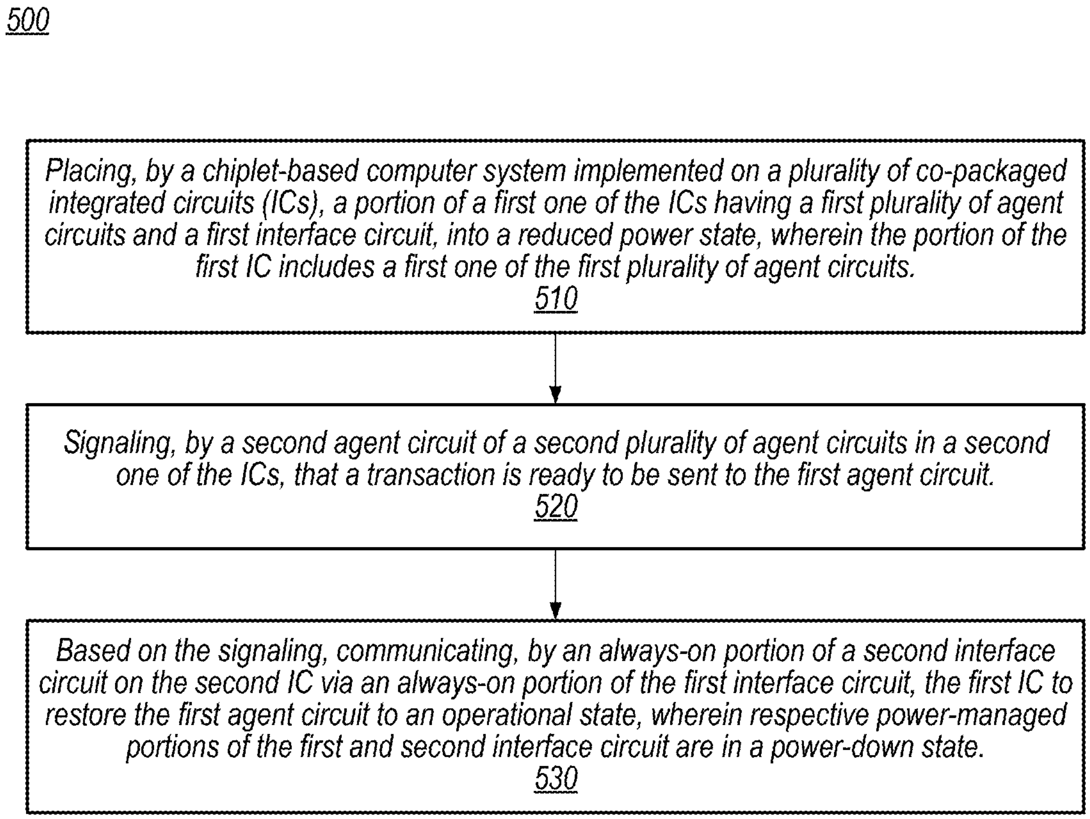
FIG. 5 shows a flow diagram of an embodiment of a method for operating a system with two integrated circuits coupled together using disclosed interface circuits.

The circuits and techniques described above in regards to FIGS. 1-4 illustrate SOCs implemented by coupling two (or more) chiplets together using b2b interface circuits. These SOC may function using a variety of methods. Three such methods are described below in regards to FIGS. 5-7. In some embodiments, the operations of the disclosed methods may be performed, in whole or in part, using instructions included in a non-transient, computer-readable memory having program instructions being executable by processor circuits in the systems to cause the operations described with reference to FIGS. 5-7.

oving now to FIG. 5, a flow diagram for an embodiment of a method for operating a chiplet-based computer system implemented on a plurality of co-packaged integrated circuits (ICs) is shown. Method 500 may be performed by a system that includes two or more integrated circuits, such as system 100 in FIG. 1. Referring collectively to FIGS. 1 and 5, method 500 begins in block 510.

At block 510, method 500 begins with the chiplet-based computer system placing a portion of a first one of the ICs having a first plurality of agent circuits and a first interface circuit, into a reduced power state, wherein the portion of the first IC includes a first one of the first plurality of agent circuits. For example, a power management circuit, included in or coupled to system 100, may provide an indication to IC 101*b* to place agent circuits 150*d* and 150*e* into a reduced power state. In response to the indication, IC 101*b* may place agent circuits 150*d* and 150*e* into an inactive state in which neither agent circuit is operational. In some embodiments, this may include gating one or more power signals and/or clock signals off. In addition, IC 101*b* may further place power-managed portion 130*b* of b2b interface circuit 110*b* into a reduced power state, during which pins included in power-managed portion 130*b* may not be capable of sending or receiving signals to or from b2b interface circuit 110*a*.

Method 500, at block 520, continues with a second agent circuit of a second plurality of agent circuits in a second one of the ICs signaling that a transaction is ready to be sent to the first agent circuit. For example, agent circuit 150*a* in IC 101*a* may be configured to send, while IC 101*b* is in a reduced power state in which agent circuit 150*d* is in the reduced power state, a transaction to agent circuit 150*d*, via b2b interface circuit 110*a*. Agent circuit 150*a* may be an audio circuit configured to receive voice commands from a microphone coupled to system 100. Agent circuit 150*a* may send a stream of received audio data to agent circuit 150*d* which, in turn, may be a neural network configured to analyze a received audio stream to identify one or more spoken commands. Upon having one or more transactions to send to agent circuit 150*d*, agent circuit 150*a* signals, e.g., by sending a first transaction to b2b interface circuit 110*a* via communication fabric 160*a*.

At block 530, method 500 proceeds with, based on the signaling, an always-on portion of a second interface circuit on the second IC communicating, via an always-on portion of the first interface circuit, with the first IC to restore the first agent circuit to an operational state. In some embodiments, respective power-managed portions of the first and second interface circuit are in a power-down state during the communicating. For example, after receiving the first transaction, b2b interface circuit 110*a* may use always-on portion 120*a* to send wake signal 140 to always-on portion 120*b* in b2b interface circuit 110*b*.

Method 500 may end in block 530. In some embodiments, IC 101*a* may include a second instance of b2b interface circuit 110*a* that is coupled to a third IC with a similar b2b interface circuit. In such embodiments, two instances of method 500 may be performed coherently in system 100.

Figure 6:
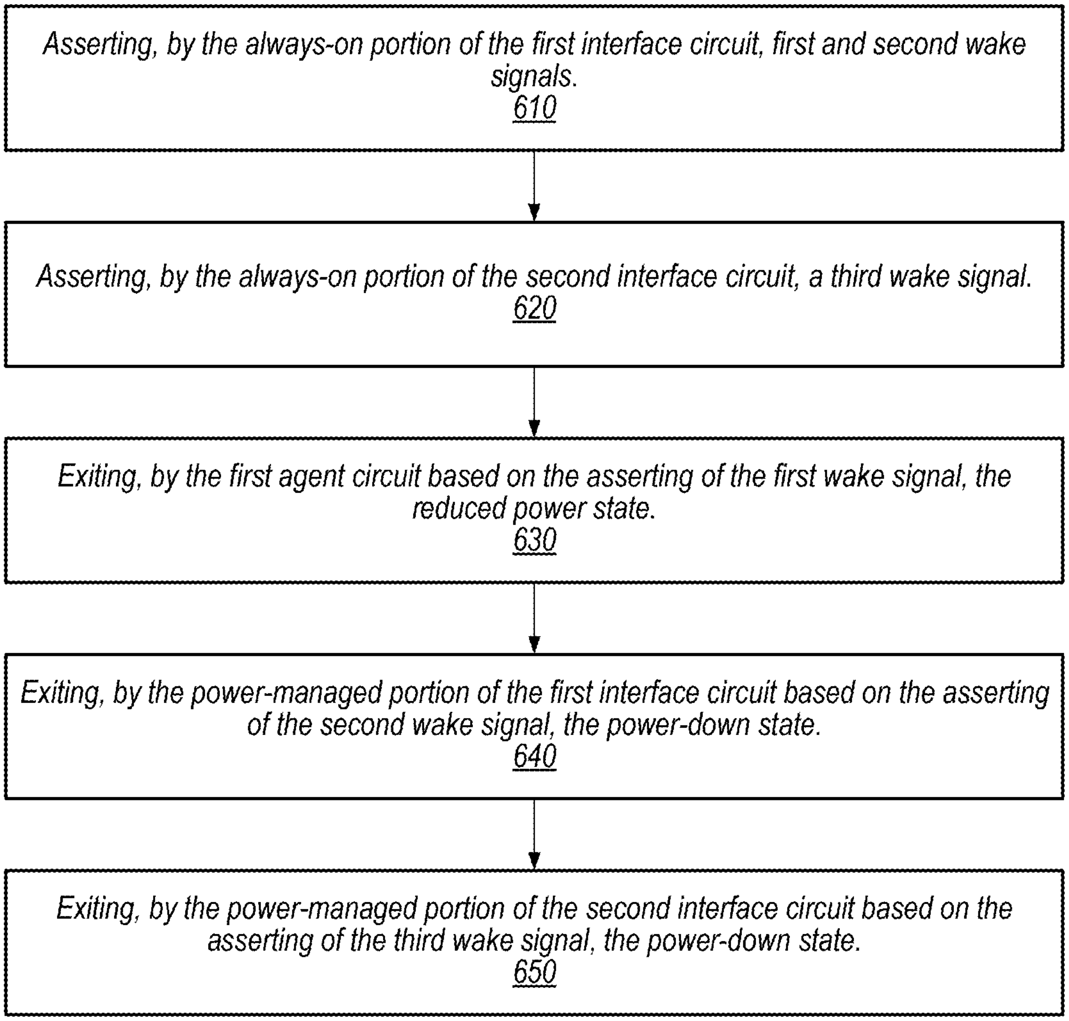
FIG. 6 depicts a flow diagram of an embodiment of a method for waking circuits in a system with two integrated circuits using the disclosed interface circuits.

Proceeding now to FIG. 6, a flow diagram for an embodiment of a method for waking, by the second IC in the chiplet-based computer system of FIG. 5, power-managed portions of the second and first ICs is shown. In a similar manner as method 500, method 600 may also be performed by a system such as system 100 in FIG. 1. In some embodiments, method 600 may be performed subsequent to block 530 of method 500. Referring collectively to FIGS. 1 and 6, method 600 begins in block 610 after block 530 has been performed.

At block 610, method 600 begins with the always-on portion of the first interface circuit asserting first and second wake signals. For example, always-on portion 120*b* may be configured to receive wake signal 140, sent by always-on portion 120*a* as described in block 530 above, and to forward wake signal 140 to power-managed portion 130*b* and to agent circuit 150*d*. In various embodiments, assertion of wake signal 140 may be a transition of a single circuit node from a de-asserted state to an asserted state. In other embodiments, wake signal 140 may be a data word, sent serially or in parallel, in which one or more particular values of the data value indicate a request to wake to an operational state. In some embodiments, wake signal 140 may be sent by always-on portion 120*a* in a first format and translated, by always-on portion 120*b*, into one or more different formats to be sent to power-managed portion 130*b* and to agent circuit 150*d*.

Method 600 continues at block 620 with the always-on portion of the second interface circuit asserting a third wake signal. Always-on portion 120*a*, for example, may be configured to send wake signal 140 to power-managed portion 130*a*. In some embodiments, always-on portion 120*a* may send wake signal 140 to power-managed portion 130*a* concurrent with sending wake signal 140 to always-on portion 120*b*.

At block 630, method 600 proceeds with the first agent circuit, based on the asserting of the first wake signal, exiting the reduced power state. For example, after receiving wake signal 140 from always-on portion 120*b*, agent circuit 150*d* may be configured to exit the reduced power state and return to an operational state. In some embodiments, wake signal 140, as received from always-on portion 120*b*, may include an indication of a particular state, of a plurality of operational states, to enter.

Method 600 may continue at block 640 with the power-managed portion of the first interface circuit, based on the asserting of the second wake signal, exiting the power-down state. In a similar fashion as for agent circuit 150*d*, power-managed portion 130*b* may be configured to enter a particular operational state after receiving wake signal 140. In some embodiments, wake signal 140, as received from always-on portion 120*b*, may include an indication of a particular state, of a plurality of operational states, to enter. In such embodiments, wake signal 140 may indicate a different state for power-managed portion 130*b* than for agent circuit 150*d*.

At block 650, method 600 may proceeds with the power-managed portion of the second interface circuit, based on the asserting of the third wake signal, exiting the power-down state. As described above for power-managed portion 130*b*, power-managed portion 130*a* may be configured to enter a respective operational state after receiving wake signal 140 from always-on portion 120*a*. Wake signal 140 may include a respective indication of a particular one of the plurality of operational states to enter. In such embodiments, wake signal 140 may indicate a similar state for power-managed portion 130*a* as for power-managed portion 130*b*, thereby enabling the two power-managed portions 130 to communicate efficiently.

It is contemplated that, in other embodiments, wake signal 140 may be sent, by always-on portions 120, to respective power management circuits (not illustrated) rather than to agent circuit 150*d* and power-managed portions 130. In such embodiments, respective wake signals 140 from always-on portions 120 may indicate while elements of each IC 101 are to be awoken and may further include an indication of a particular state into which each awoken element is to enter. For example, always-on portion 120*b* may send an indication to a respective power management circuit in IC 101*b*, the indication identify agent circuit 150*d* and power-managed portion 130*b*, as well as respective indications of which operational mode agent circuit 150*d* and power-managed portion 130*b* should enter upon waking up.

Method 600 may end in block 650, or may repeat one or more blocks. For example, if a second agent circuit in IC 101*a* also has a transaction to send to a different agent circuit in IC 101*b*, then some or all of the operations of method 600 may be repeated to send a respective wake signal to the different agent circuit. As described above for method 500, two instances of method 600 may be performed coherently in system 100.

Figure 7:
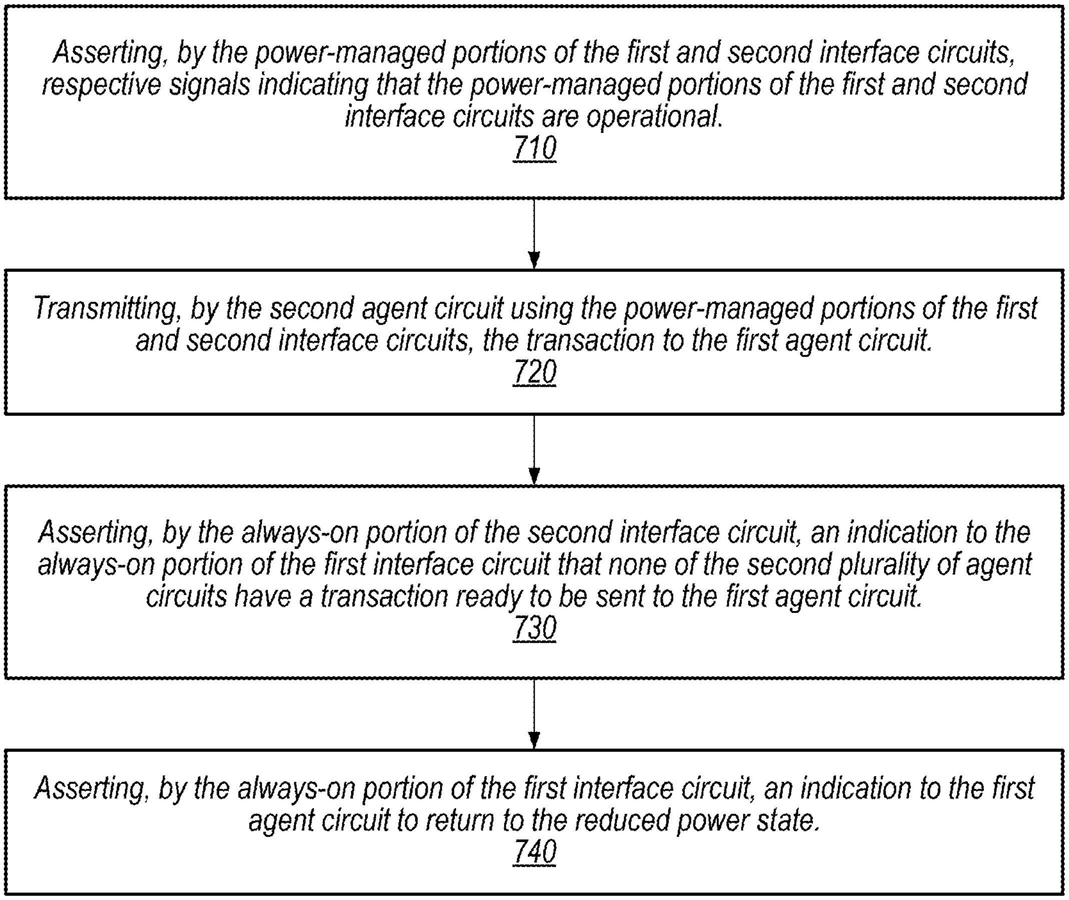
FIG. 7 illustrates a flow diagram of an embodiment of a method for managing power in a system with two integrated circuits after transmission of a transaction has completed.

Turning now to FIG. 7, a flow diagram for an embodiment of a method for completing, by the chiplet-based computer system of FIG. 5, the transaction initiated by an agent circuit of the second IC is shown. Method 700 may also be performed by a system such as system 100 in FIG. 1. In some embodiments, method 700 may be performed subsequent to block 650 of method 600. Referring collectively to FIGS. 1 and 7, method 700 begins in block 710 after block 650 has been performed.

Method 700 begins at block 710 with the power-managed portions of the first and second interface circuits asserting respective signals indicating that the power-managed portions of the first and second interface circuits are operational. For example, each of power-managed portions 130 may assert a signal on a particular pin in a given pin bundle (e.g., a control bundle) that is coupled to the other power-managed portion 130. In such embodiments, a full hand-shaking operation may not be required. Instead, power-managed portion 130*b* may assert the particular pin, indicating that transactions are ready to be received. Power-managed portion 130*b* may be configured to subsequently receive transactions from power-managed portion 130*a* without receiving a respective operational signal from power-managed portion 130*a*. A reduction or elimination of hand-shaking operations after returning to an operational state may enable b2b interface circuits 110 to complete the waiting transaction from agent circuit 150*a* to agent circuit 150*d* is less time than if a full hand-shaking operation were to be performed.

In other embodiments, the indications from power-managed portions 130 may be sent to the respective always-on portions instead. Respective control bundles for each of b2b interface circuits 110 may be included in the always-on portions 120. Accordingly, always-on portions 120 may assert the respective indications rather than the power-managed portions 130.

At block 720, method 700 continues with the second agent circuit, using the power-managed portions of the first and second interface circuits, transmitting the transaction to the first agent circuit. After power-managed portion 130*a* is in an operational state, agent circuit 150*a* may send the transaction for agent circuit 150*d* to b2b interface circuit 110*a*. In turn, b2b interface circuit 110*a* may use a subset of power-managed portion 130*a* to send the transaction to b2b interface circuit 110*b*. Transmittal of the transaction may also include use of a subset of always-on portion 120*a*.

At block 730, method 700 proceeds with the always-on portion of the second interface circuit asserting an indication to the always-on portion of the first interface circuit that none of the second plurality of agent circuits have a transaction ready to be sent to the first agent circuit. After the transaction from agent circuit 150*a* to agent circuit 150*d* has been completed, always-on portion 120*a* may send a message to always-on portion 120*b* that indicates that there are no further transactions to be sent from b2b interface circuit 110*a* to b2b interface circuit 110*b*. In some embodiments, always-on portion 120*a* may be configured to poll agent circuits 150*a*-150*c* to determine if a pending transaction is being prepared or if it is otherwise suitable to return the power-managed portions 130 of b2b interface circuits 110 into their respective reduced power states.

Method 700 may continue to block 740 with the always-on portion of the first interface circuit asserting an indication to the first agent circuit to return to the reduced power state. Always-on portion 120*b* may, in response to the message from always-on portion 120*a*, send the indication to agent circuit 150*d*, thereby enabling agent circuit 150*d* to return to the previous reduced power state. In some embodiments, power-managed portions 130 and agent circuit 150*d* may return to their respective reduced power states without any indications being sent by respective power management circuits. In other embodiments, always-on portions 120 may send their respective indications to return to reduced power states to respective power management circuits which, in turn, place power-managed portions 130 and agent circuit 150*d* back into their prior reduced power states.

It is noted that the method of FIG. 7 is merely an example for managing operation of a b2b interface between two coupled ICs. Method 700 may end in block 740, or some or all of the operations may be repeated. For example, block 740 may be repeated for additional agent circuits (e.g., agent circuit 150*e*) that may have been awoken to perform a given task, but are no longer needed to be in an operational state. As previously described, any of the disclosed methods 500-700 may be performed concurrently with other instances of the methods.

Figure 8:
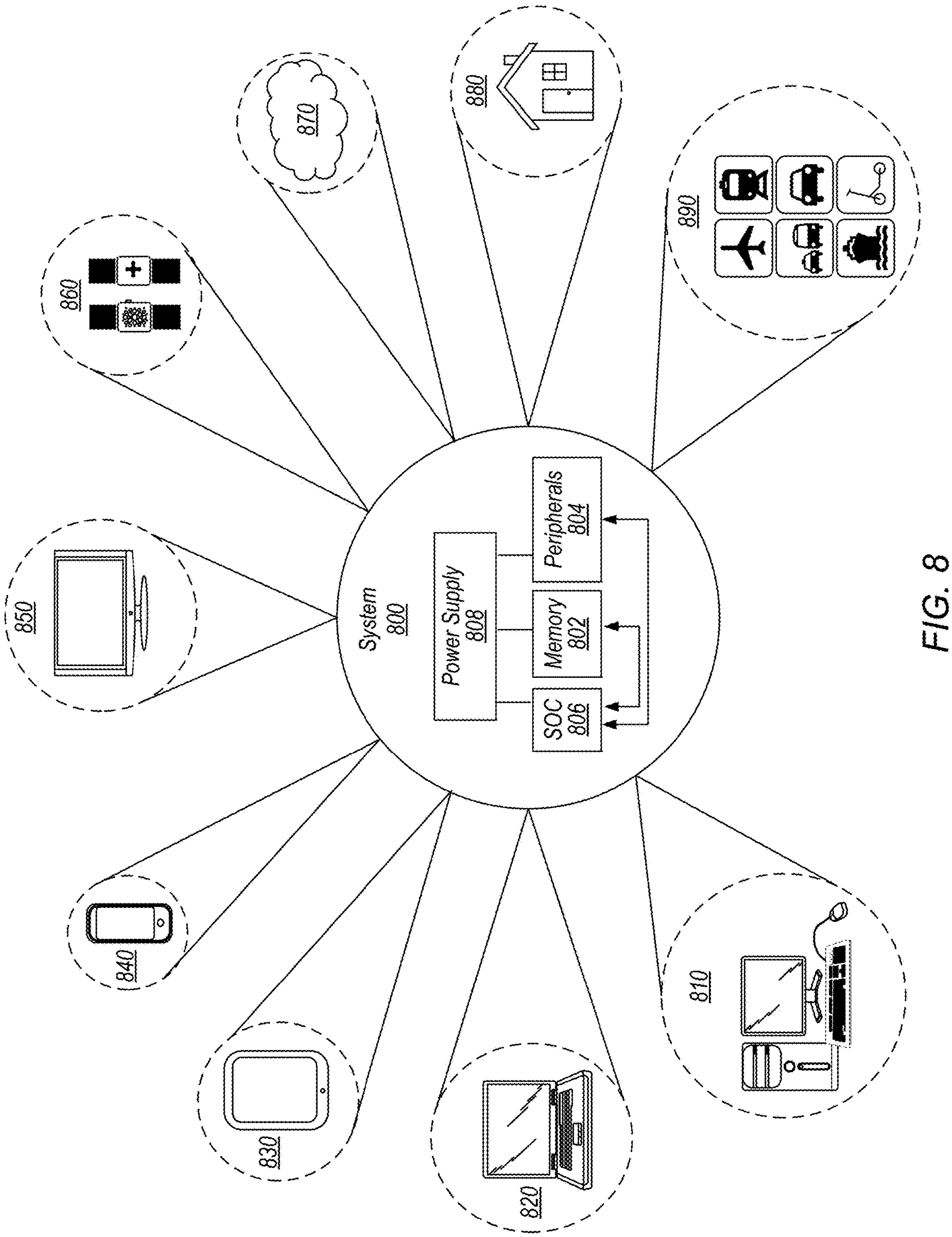
FIG. 8 depicts various embodiments of systems that include coupled integrated circuits.

FIGS. 1-7 illustrate apparatus and methods for a system that includes coupling of two or more integrated circuits using b2b interface circuits with respective always-on and power-managed portions. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SOC) or other type of integrated circuit. A block diagram illustrating an embodiment of computer system 800 is illustrated in FIG. 8. Computer system 800 may, in some embodiments, include any disclosed embodiment of systems 100-400.

In the illustrated embodiment, the system 800 includes at least one instance of a system on chip (SOC) 806 which may include multiple types of processing circuits, such as a central processing unit (CPU), a graphics processing unit (GPU), or otherwise, a communication fabric, and interfaces to memories and input/output devices. In some embodiments, SOC 806 corresponds to one of the disclosed chiplet-based systems 100-400, and therefore, various portions of the disclosed elements of SOC 806 may be implemented on one or more chiplets comprising SOC 806. In some embodiments, one or more processors in SOC 806 includes multiple execution lanes and an instruction issue queue. In various embodiments, SOC 806 is coupled to external memory 802, peripherals 804, and power supply 808.

A power supply 808 is also provided which supplies the supply voltages to SOC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SOC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SOC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices 860 are contemplated as well, such as devices worn around the neck, devices attached to hats or other headgear, devices that are implantable in the human body, eyeglasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise.

It is noted that the wide variety of potential applications for system 800 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 8 are illustrative only and are not intended to be limiting. Other devices are possible and are contemplated.

As disclosed in regards to FIG. 8, computer system 800 may include two or more integrated circuits coupled together and included within a personal computer, smart phone, tablet computer, or other type of computing device. A process for designing and producing an integrated circuit using design information is presented below in FIG. 9.

Figure 9:
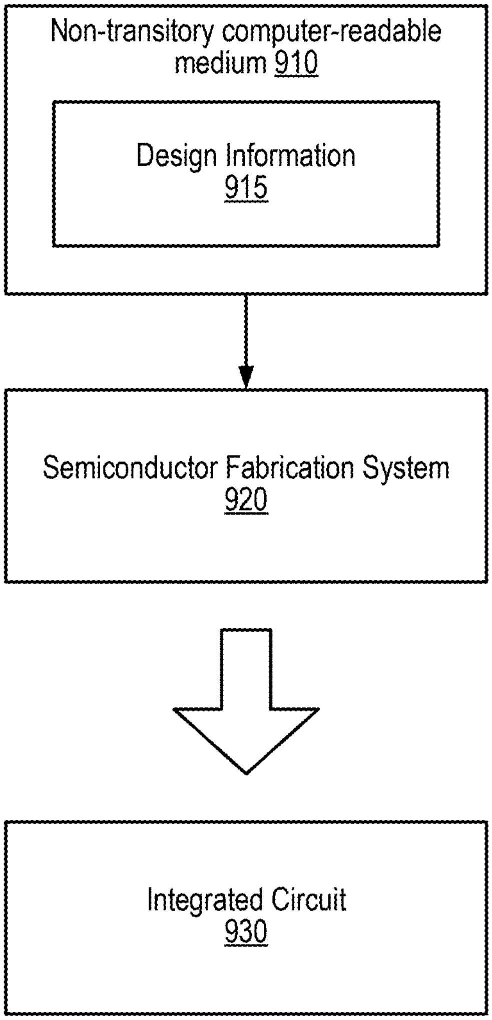
FIG. 9 shows a block diagram of an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, any or all of integrated circuits 101-407 as shown in FIGS. 1-4. In the illustrated embodiment, semiconductor fabrication system 920 is configured to process the design information 915 stored on non-transitory computer-readable storage medium 910 and fabricate integrated circuit 930 (e.g., IC 101) based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits, such as ICs 101-407 in FIGS. 1-4.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or"is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for"[performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:

a chiplet-based computer system implemented on a plurality of co-packaged integrated circuits (ICs) that includes a first IC having a first set of agent circuits and a second IC having a second set of agent circuits;

wherein the first IC includes a first interface with a first always-on portion and a first power-managed portion, and wherein the second IC includes a second interface coupled to the first interface, the second interface with a second always-on portion and a second power-managed portion, and wherein the first and second interfaces are configured to enable communication between the first and second sets of agent circuits as a single system-on-chip;

wherein a first agent circuit of the first set of agent circuits in the first IC is configured to send, while the second IC is in a reduced power state, transaction to a second agent circuit of the second set of agent circuits, via the first interface;

wherein to send the transaction to the second agent circuit, the first interface is configured to:

communicate, from the first always-on portion to the second always-on portion, a request to the second IC to cause the second IC to wake up the second agent circuit; and wake, via the first always-on portion, the first power-managed portion to receive a response from the second power-managed portion indicating that the second agent circuit is operational; and wherein the second interface is configured to:

wake, based on a reception of the request by the second always-on portion, the second power-managed portion and the second agent circuit; and send, from the second power-managed portion to the first power-managed portion, the response indicating that the second agent circuit is operational.

2. The apparatus of claim 1, wherein the first interface is further configured to:

use the first and second power-managed portions of the first and second interfaces to transmit the transaction to the second agent circuit.

3. The apparatus of claim 1, wherein the first IC includes a first communication fabric coupled to the first set of agent circuits within the computer system, and the second IC includes a second communication fabric coupled to the second set of agent circuits within the computer system.

4. The apparatus of claim 3, wherein the first IC includes a central processor unit (CPU); and wherein the second IC includes a graphic processor unit (GPU).

5. The apparatus of claim 1, wherein the first always-on portion includes a first pin bundle that is coupled to a first power supply signal and a first clock signal; and wherein the first power-managed portion includes a second pin bundle that is coupled to a second power supply signal and a second clock signal that are different from the first power supply signal and first clock signal.

6. The apparatus of claim 1, wherein the first and second interfaces include respective sets of pin bundles, ones of the pin bundles supporting given interface functions.

7. The apparatus of claim 6, wherein the first interface includes respective pin bundles for always-on communication, system control signals, and a first number of agent-to-agent communication protocols.

8. The apparatus of claim 7, wherein the second interface includes respective pin bundles for the always-on communication, the system control signals, and a second number of agent-to-agent communication protocols, wherein the second number is less than the first number.

9. The apparatus of claim 7, wherein the always-on communication bundle includes a pin for a clock signal and signals on other pins in the always-on communication bundle are synchronous to the clock signal.

10. The apparatus of claim 9, wherein the system control signals bundle includes at least a portion of the system control signals that are asynchronous.

11. A method comprising:

placing, by a chiplet-based computer system implemented on a plurality of co-packaged integrated circuits (ICs), a portion of a first one of the ICs having a first plurality of agent circuits and a first interface circuit, into a reduced power state, wherein the portion of the first IC includes a first one of the first plurality of agent circuits;

signaling, by a second agent circuit of a second plurality of agent circuits in a second one of the ICs, that a transaction is ready to be sent to the first agent circuit; and based on the signaling, communicating, by an always-on portion of a second interface circuit on the second IC via an always-on portion of the first interface circuit, a request to the first IC to restore the first agent circuit to an operational state, wherein respective power- managed portions of the first and second interface circuits are in a power-down state;

waking, by the always-on portion of the second interface circuit, the power-managed portion of the second interface circuit to receive a response from the power-managed portion of the first interface circuit; and waking, by the always-on portion of the first interface circuit based on receiving the request, the power-managed portion of the first interface circuit and the first agent circuit;

sending, by the power-managed portion of the first interface circuit to the power-managed portion of the second interface circuit, the response indicating that the first agent circuit is operational; and sending, by the second agent circuit via the power-managed portions of the first and second interface circuits, the transaction to the first agent circuit.

12. The method of claim 11, wherein waking the power-managed portion of the first interface circuit and the first agent circuit includes asserting, by the always-on portion of the first interface circuit, first and second wake signals; and wherein waking the power-managed portion of the second interface circuit includes asserting, by the always-on portion of the second interface circuit, a third wake signal.

13. The method of claim 12, further comprising:

exiting, by the first agent circuit based on the asserting of the first wake signal, the reduced power state;

exiting, by the power-managed portion of the first interface circuit based on the asserting of the second wake signal, the power-down state; and exiting, by the power-managed portion of the second interface circuit based on the asserting of the third wake signal, the power-down state.

14. The method of claim 11, further comprising:

exchanging, by the first and second interface circuits, transactions between the first and second sets of agent circuits as a single system-on-chip.

15. The method of claim 11, further comprising:

asserting, by the always-on portion of the second interface circuit, an indication to the always-on portion of the first interface circuit that none of the second plurality of agent circuits have a transaction ready to be sent to the first agent circuit; and asserting, by the always-on portion of the first interface circuit, an indication to the first agent circuit to return to the reduced power state.

16. A system, comprising:

a first integrated circuit (IC) die including a first interface; and a second IC die including a second interface coupled to the first interface;

wherein the first and second interfaces include respective always-on portions and respective power-managed portions, and wherein the first and second interfaces are configured to enable communication between the first and second IC dies as a single system-on-chip;

wherein the second IC die is configured to:

based on a signal for the second IC die to enter a reduced power mode, power down the power-managed portion of the second interface; and enter the reduced power mode; and wherein the first IC die is configured to:

based on the signal for the second IC die to enter the reduced power mode, power down the power-managed portion of the first interface while other circuits of the first IC die remain operational; and based on a determination that a transaction is ready to be sent to the second IC die, use the always-on portion of the first interface to assert a wake signal to the second IC die, wherein the wake signal is asserted while the power-managed portion of the first interface is powered down;

based on the assertion of the wake signal to the second IC die, wake the power-managed portion of the first interface to receive a response from the power-managed portion of the second interface indicating that the second IC die is operational; and wherein the always-on portion of the second interface is configured to wake, based on reception of the wake signal, the second IC die; and wherein the second IC die is configured to send, via the power-managed portion of the second interface, the response indicating that the second IC die is operational.

17. The system of claim 16, wherein to wake the second IC die, the always-on portion of the second interface is further configured to:

cause the second IC die to exit the reduced power mode; and restore power to the power-managed portion of the second interface.

18. The system of claim 16, wherein the first and second IC dies are coupled together within a common chip-level package.

19. The system of claim 16, wherein the second IC die further includes a third interface, different from the first and second interfaces; and wherein the third interface is configured to communicate with a fourth interface on a third IC die.

20. The system of claim 19, wherein the third IC die is a different instance of the second IC die; and wherein the third and fourth interfaces are different instances of a same circuit design, and are configured to be coupled, via a set of wires, to one another around a common axis of symmetry without crossing any of the set of wires.

* * * * *